United States Patent [19]

Martone et al.

[11] Patent Number: 5,618,083
[45] Date of Patent: Apr. 8, 1997

[54] LINEAR SEAT BACK RECLINER MECHANISM

[75] Inventors: Michael A. Martone; Tyrone R. Secord, both of Troy, Mich.

[73] Assignee: Maple Automotive Innovations, Inc., Troy, Mich.

[21] Appl. No.: 609,342

[22] Filed: Mar. 1, 1996

[51] Int. Cl.⁶ .................................................. B60N 2/20
[52] U.S. Cl. ...................... 297/375; 297/362.12; 188/67
[58] Field of Search ............................. 297/375, 362.12, 297/261.1; 248/424

[56] References Cited

U.S. PATENT DOCUMENTS 3,216,766  11/1965  Tabor et al. .
4,372,612   2/1983  Wiers et al. .
4,457,406   7/1984  Porter .
4,591,207   5/1986  Nithammer et al. .
4,781,415  11/1988  Heesch et al. .
5,052,752  10/1991  Robinson .

*Primary Examiner*—Peter M. Cuomo
*Assistant Examiner*—David E. Allred
*Attorney, Agent, or Firm*—Gifford, Krass, Groh, Sprinkle, Patmore, Anderson & Citkowski, P.C.

[57] ABSTRACT

An adjustable seat back recliner mechanism employs a linear actuator to provide infintely adjustable operation. The actuator rod is maintained in its locked position by the contact of a friction surface on the rod with a friction surface on a lower clamp member. Upper clamp members transmit spring locking force through the actuator rod to the lower clamp member by the pivotal action of locking plates. External forces applied to the actuator amplify the locking force applied through the locking plates.

8 Claims, 4 Drawing Sheets

LINEAR SEAT BACK RECLINER MECHANISM

BACKGROUND OF THE INVENTION

1. Field of the Invention

This invention relates to a seat back recliner mechanism, and, more particularly, this invention relates to a linear actuator particularly adapted for use in an infinitely adjustable seat back recliner mechanism.

2. State of the Art

Automotive and aircraft seats are commonly provided with two or more adjustments for user comfort, most of them including an adjustment of the seat back relative to the seat cushion. There are numerous seat back recliner mechanisms available with the trend being toward the infinitely variable type. The industry presently defines an infinitely variable seat back recliner to be one capable of adjustments in increments as fine as one degree or less.

There is a wide variety of infinitely variable seat back recliner devices available, usually involving complex mechanisms with numerous parts including types with helical camming surfaces, friction drums, wedging rollers, split nut and screw devices, coil spring-rod locks, ratchet and palls, and the like. While these various mechanisms work and meet with varying degrees of success, they have various problems of added weight and expense and usually a problem Of occupying too much space. While much attention has been given to the force generated by the device to keep the mechanism in its adjusted position, there is notable silence on what happens when the device is subject to a sudden or catastrophic force such as that occurring in a sudden braking or vehicle collision.

SUMMARY OF THE INVENTION

The present invention addresses the difficulties prevalent in the state of the art and pioneers in the area of handling unexpected forces. The result is a lightweight, compact linear actuator which is believed will provide a very competitively priced seat back recliner mechanism.

The linear actuator of this invention includes a longitudinally extending actuator rod having a planar upper surface and a lower planar friction surface joined by opposed sides with a pivotal connection at one end of the rod for connection to the recliner mechanism linkage. An elongate lower clamp member has an upper friction surface for engaging the lower planar friction surface of the rod. The lower clamp member also has a central aperture for receiving a lock release shaft. A pair of generally triangular shaped lock plates are provided parallel and adjacent to one of the actuator sides pivotally connected to the lower clamp member at opposed ends of the clamp member and extending upwardly above and inwardly to overlap each other at a midpoint of the lower clamp member. A mounting spacer is received in an upper aperture of each of the lock plates for mounting the actuator to a seat member. A pair of upper clamp members are each pivotally connected to one of the lock plates to present a planar surface in contact with the upper planar surface of the actuating rod. A spring is connected between each of the lock plates and the lower clamp member to bias the upper and lower clamp members in contact with the upper and lower planar surfaces of the actuating rod creating a locking engagement between the lower planar friction surface of the rod and the upper planar friction surface of the lower clamp member.

A lock release shaft extends through the central aperture of the lower clamp member carrying a cam for contacting a lower edge of the lock plates when the shaft is rotated to move the lock plates upward to release the actuating rod for movement relative to the clamp members. This permits adjustment of the inclination of the seat back through said recliner mechanism.

When a load applied to the actuator rod in its locked position, the load will be delivered to the seat frame through the mounting spacer by the lock plate on a side of the mounting spacer in the direction of the load, causing this load delivering lock plate to pivot downwardly to supply a greater force through the associated upper clamp member to maintain the actuating rod locked to the lower clamp member.

In a preferred form of the invention there are lock plates on both sides of the actuator rod and the rod is under cut on both sides to form longitudinally extending channels. The lock plates are formed with projections which extend into the channels so that when the lock plates are moved upwardly by rotation of the lock release shaft, the projections will engage shoulders of these channels to lift the actuator rod, positively separating the lower planar friction surface of the rod from the upper friction surface of the lower clamp member for noiseless translation of the rod as it is being adjusted to a new seat position.

In a preferred form of the actuator, the upper friction surface of the lower clamp member and the lower planar friction surface of the actuator rod will have inter-locking serrations.

BRIEF DESCRIPTION OF THE DRAWING

The advantages of the present invention will be more apparent from the following detailed description when considered in connection with the accompanying drawing wherein.

DETAILED DESCRIPTION OF THE PREFERRED EMBODIMENT

Figure 1:
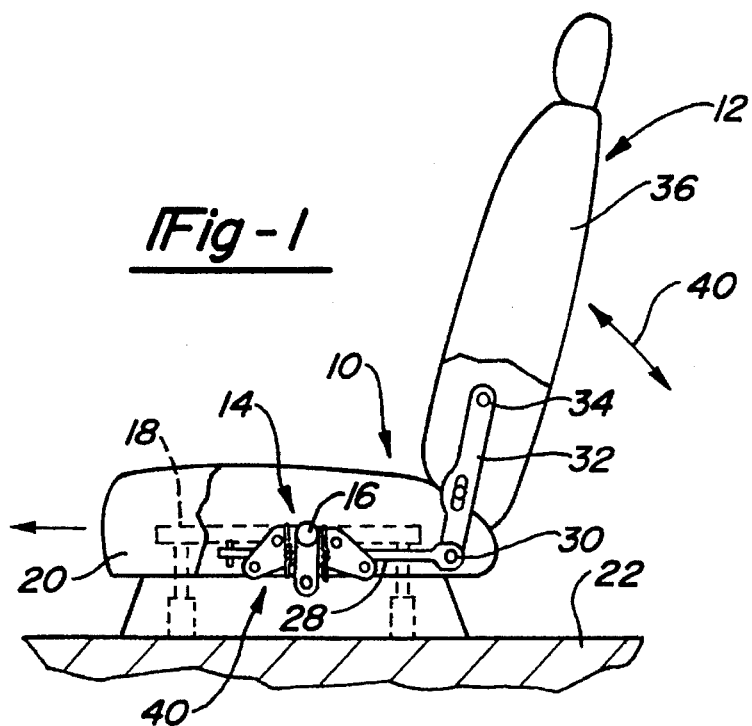
FIG. 1 is a side elevational view of a recliner seat with the seat back recliner mechanism of the present invention installed.
Figure 2:
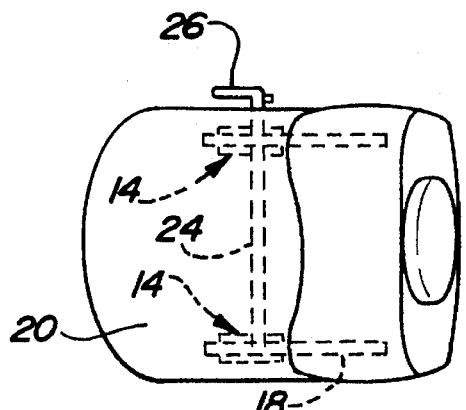
FIG. 2 is a plan view of a seat showing a typical location of a pair of recliner mechanisms along with lock release linkage.

Referring to FIG. 1, the seat back recliner mechanism 10 of this invention is shown installed on a reclining seat 12 with the linear actuator 14 of the invention mounted on a shaft 16 affixed to a seat frame 18 of seat bottom 20, the seat frame in turn attached to the vehicle floor 22. As seen in FIG. 2, two linear actuators 14 can be used adjacent the lateral sides of seat bottom 20 with a lock release shaft 24 interconnecting the two actuators 14 with a lock release handle 26 on one side of the seat. The actuator rod 28 of the linear actuator 14 is pivotally connected at 30 to pivotally connected recliner link 32 attached at 34 to a reclining seat back 36. Rotation of lock release handle 26 releases the actuator rod 28 from the body 38 of the actuator, allowing the seat occupant to change the inclination of the seat back 36 as indicated by the arrow 40. Return of the handle 26 to its original position will relock the actuator with the seat-back in its new position. It will be appreciated that the seat bottom 20 can be reciprocally movable on the frame 18 by another mechanism, not shown such another linear actuator 14.

Figure 3:
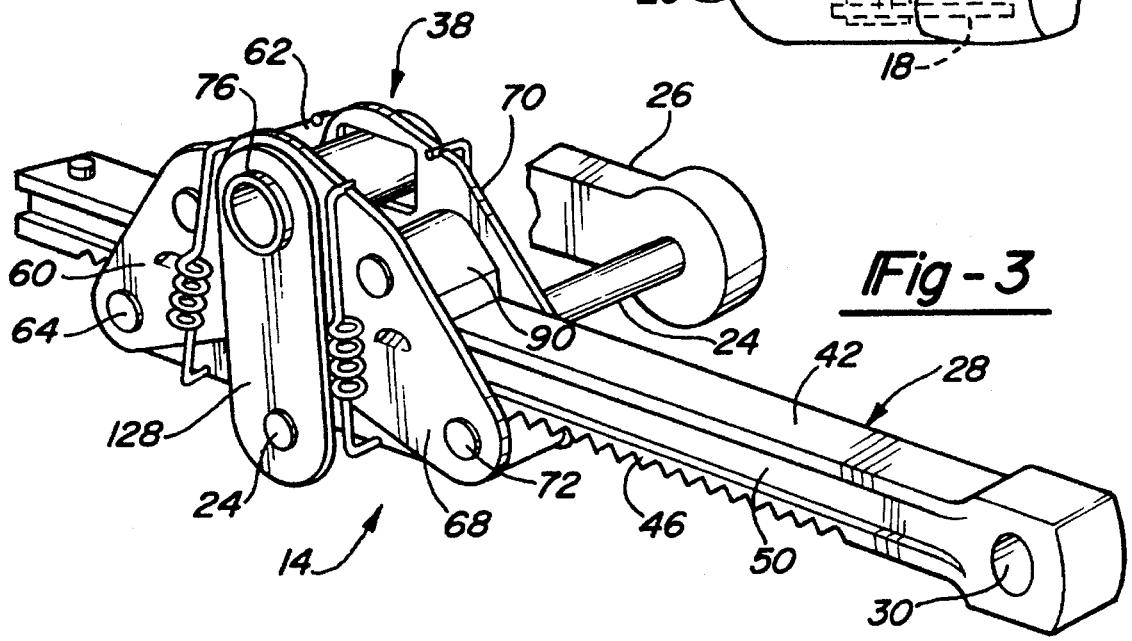
FIG. 3 is a perspective view of the linear actuator of the seat back recliner mechanism of the invention.
Figure 4:
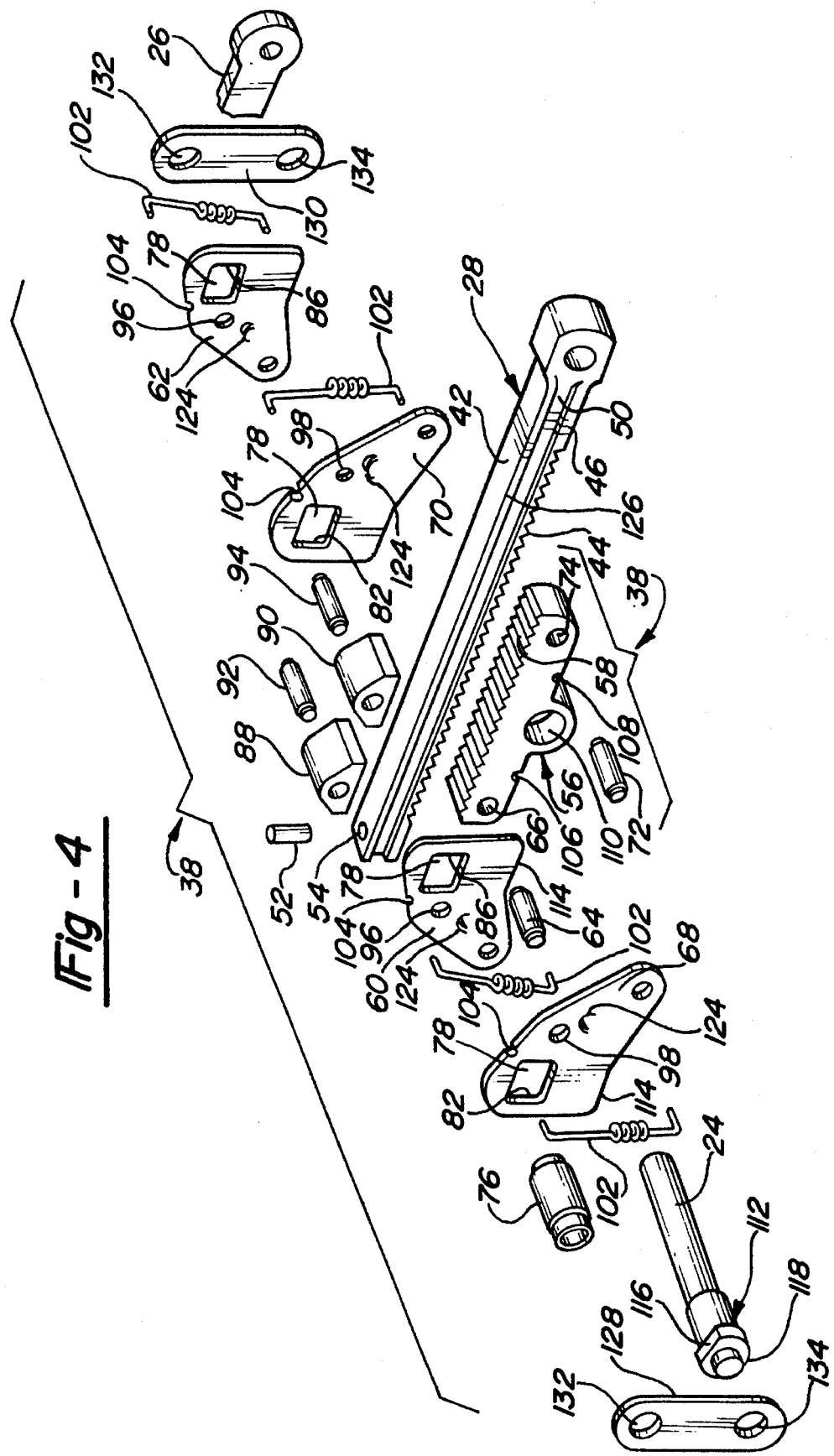
FIG. 4 is an exploded perspective view of the linear actuator of FIG. 3.
Figure 5:
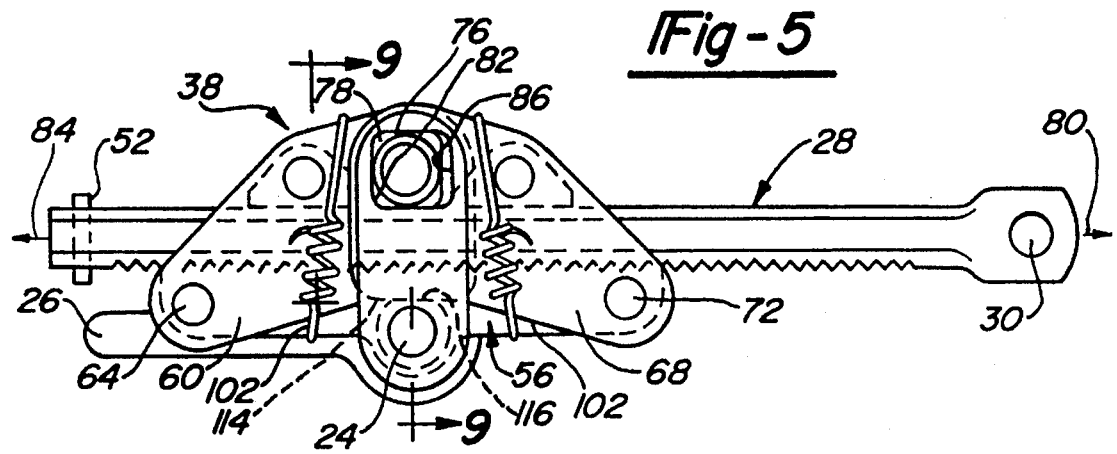
FIG. 5 is a side elevational view of the linear actuator of FIG. 3 with the lower clamp locked to the actuator rod.
Figure 7:
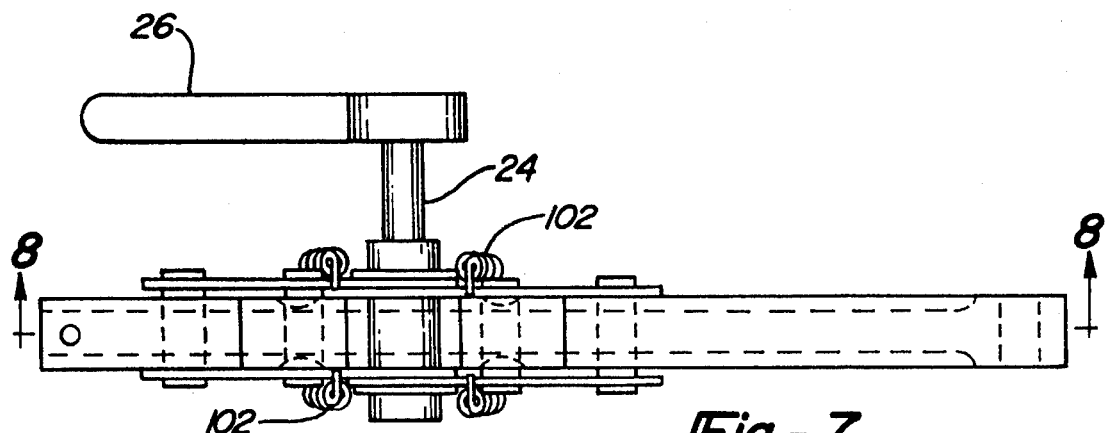
FIG. 7 is a top view of the,linear actuator of FIG. 3.

Referring primarily to FIGS. 3–5, the linear actuator 14 has a longitudinally extending actuator rod 28 and an actuator body 38. The actuator rod 28 has an upper planar surface 42 and a lower planar surface 44 that serves as a friction surface. Opposed rod sides 46 and 48 are undercut to form channels 50. A hole 30 through sides 46 and 48 at one end of the rod supplies a pivotal connection to the link 32 of recliner mechanism 10. A stop pin 52 extends through a hole 54 in planar surfaces 42 and 44 at the other end of the rod.

Figure 8:
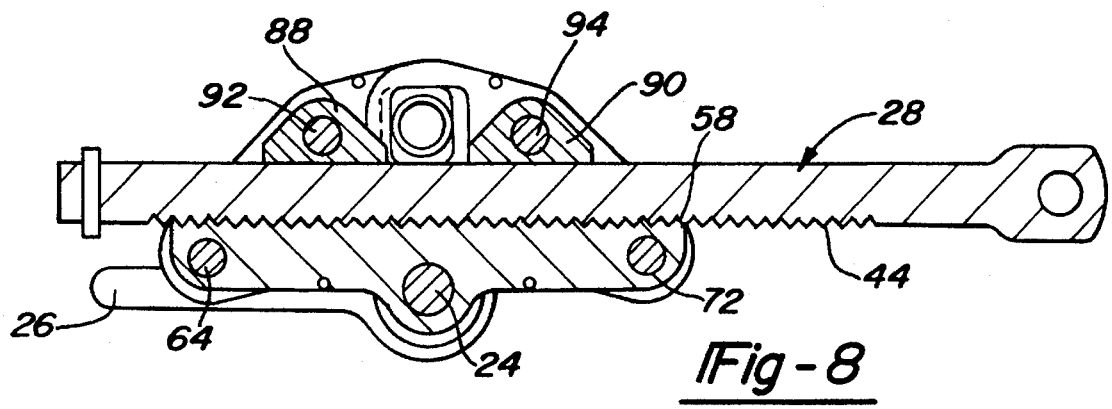
FIG. 8 is a side cross-sectional view taken along line 8—8 of FIG. 7.
Figure 9:
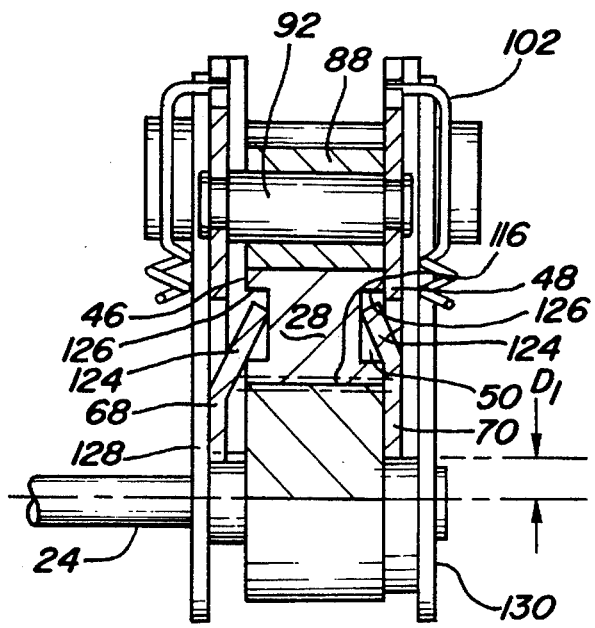
FIG. 9 is an end elevational cross-sectional view taken along line 9—9 of FIG. 5 with the actuator in its normally locked position.
Figure 10:
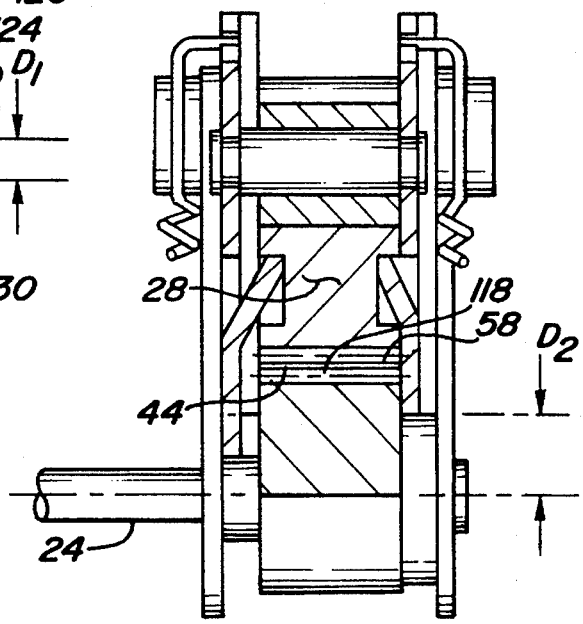
FIG. 10 is a view similar to FIG. 9 with the actuator in its unloaded, adjustable position.

The actuator 38 has a number of assembled parts including a lower clamp 56 which has an upper planar friction surface 58 that coacts with the lower planar friction surface 44 of actuator rod 28. As best seen in FIGS. 4, 8 and 10, friction surfaces 44 and 58 in their preferred farm have inter-locking serrations to enhance their gripping power. These serrations can have a 0.5 mm pitch which will provide ½° adjustments of the seat back, well within the definition of an infinite adjustment.

Generally triangular shaped lock plates are pivotally connected at opposed ends of the lower clamp by rivets. As viewed in FIGS. 3–7, front lack plates 60 and 62 are attached by a rivet 64 through hole 66 at the front end of lower clamp 56, the plates 60 and 62 contacting opposite sides of the lower clamp. Similarly, a pair of opposed rear lock plates 68 and 70 are attached by a rivet 72 through hole 74 at the rear end of lower clamp 56 with the plates contacting opposite sides of the clamp. The lock plates extend upwardly, straddling the actuator rod 28, and inwardly so that the lock plates 60 and 68 overlap each other, and plates 62 and 70 overlap each other.

A mounting spacer 76 passes through apertures or windows 78 in the overlapping portions of each of the plates. The frame mounting shaft 16 shown in FIG. 1 is mounted in mounting spacer 76. The aperture or window 78 can be generally square or rectangular allowing clearance for movement of the lock plates when a force is applied to the actuator rod 28. As best seen in FIGS. 3 and 5, when a load is applied to rod 28 to the rear in the direction of arrow 80, the load will be transferred by the lock plates 68 and 70 to the spacer 76 by contact of the left sides 82 of window 78 with the spacer 76. When a load is applied to the rod 28 to the left in the direction of arrow 84, the load will be transferred by the lock plates 60 and 62 to the spacer 76 by contact of the right sides 86 of windows 78 with spacer 76.

A pair of front and rear upper camps 88 and 90 are mounted to the lock plates by rivets 92 and 94. The front upper clamp 88 is mounted by rivet 92 through holes 96 to the front lock plates 60 and 62. The rear upper camp 90 is mounted by rivet 94 through holes 98 to rear lock plates 68 and 70. Upper clamps 88 and 90 have lower planar surfaces which contact the upper planar surface 42 of actuator rod 28.

One end of springs 102 are attached to grooves 104 in all of the lock plates 60, 62, 68 and 70. The other end of springs 102 from plates 60 and 62 are attached to the groove 106 in the lower clamp 56, and the other end of springs 102 from plates 68 and 70 are attached to the groove 108 in the lower clamp 56. The springs 102 bias the planar surfaces 100 of the upper clamps 88 and 90 in contact with the upper planar surface 42 of the actuator rod 28, and the upper planar friction surface 58 of the lower clamp 56 in contact with the lower planar friction surface 44 of the actuator rod 28 locking the actuator rod in place. The springs 102 bias the lock plates 60, 62, 68 and 70 to pivot downwardly about axes of rivets 64 and 72 causing a downward force through the plates, upper clamps 88 and 90, and actuator rod 28 to the lower clamp 56.

Figure 6:
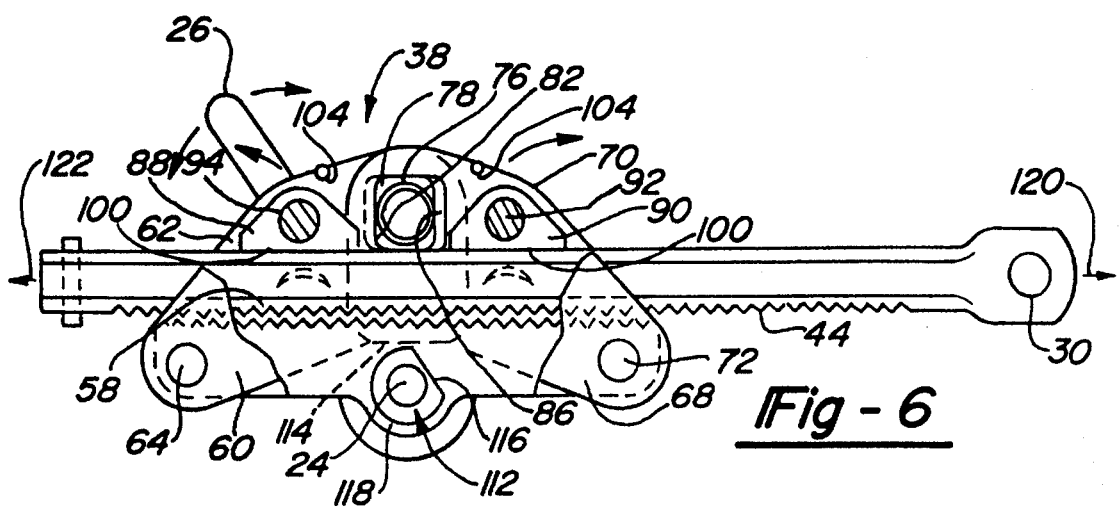
FIG. 6 is a side elevational view similar to FIG. 5 with a portion of the lock plates on one side of the actuator rod broken away for clarity to show the actuator rod unlocked and raised from the lower clamp.

The lock release shaft 24 extends through the central bore 110 in the lower clamp member 56 carrying a cam 112 for contact with the lower edges 114 of the outboard lock plates 60 and 68. The cam 112 has a flat Surface 116 which will be adjacent to the lower edges 114 when the lock release handle 26 is in its substantially horizontal locked position as seen in FIG. 5, causing no lifting force to be applied to the lock plates. When the handle is rotated upwardly as seen in FIG. 6, an arcuate portion 118 of the cam will rotate to be in contact with the edges 114 to lift the lock plates 60 and 68, unlocking the lower planar friction surface 44 of the actuator rod 28 from the upper planar friction surface 58 of the lower clamp 56, permitting adjusting movement of the rod 28 in either direction as shown by the arrows 120 and 122 in FIG. 6.

Each of the lock plates have a projection 124 which extends into one of the channels 50 in the actuator sides 46 and 48. When the cam 112 lifts the lock plates 60 and 68 also causing the lock plates 62 and 70 to be lifted, the projections 124 engage the upper shoulder 126 of the channels 50 causing the lifting of the actuator rod 28 to positively separate the lower planar friction surface 44 of the rod from the upper planar friction surface 58 of the lower clamp member 56, allowing the rod to be adjusted without serration noise.

Side retention plates 128 and 130 are added to the actuator body 38 by the insertion of the ends of the lock release shaft 24 and the mounting spacer 76 through upper and lower holes 132 and 134 in both retention plates. The ends of the mounting spacer 76 and the cam end of lock release shaft can be staked for retention of the plates as are the ends of the rivets 64, 72, 92 and 94 staked adjacent to the lock plates.

When a load is applied to the lock actuator rod in either direction indicated by the arrows 80 and 84 in FIG. 5, as by sudden braking or vehicle collision, the load transmitted to the mounting spacer 76, and thus to the vehicle frame, will create a downward force couple on the lock plates which are located between the spacer and the force direction side which will be transmitted through the upper clamp on that side to further absolutely lock the frictions surfaces of the actuator rod and the lower clamp member. Thus when the force is rearward as indicated by the arrow 80 in FIG. 5, the rear lock plates 68 and 70 will pivot downwardly about rivet 72 to transmit a downward force on the right upper clamp 90, and when the force is forward as indicated by the arrow 84 in FIG. 5, the front plates 60 and 62 will pivot downwardly about rivet 64 to transmit a downward force on the front upper clamp 88.

We claim:

1. A linear actuator for use in a seat back recliner mechanism to permit manual adjustment of the inclination of a seat back relative to a seat member, comprising:

a longitudinally extending actuator rod having an upper planar surface and a lower planar friction surface joined by opposed sides and a pivotal connection at one end for connection to said recliner mechanism;

an elongate lower clamp member having an upper friction surface for engaging the lower planar friction surface of said rod, and a central aperture for receiving a lock release shaft;

two pairs of opposed, generally triangular shaped, lock plates, each pair being pivotally connected to said lower clamp member at opposed ends of said member, and the opposed plates of each pair being on opposite sides of said actuating rod;

a mounting spacer received in an upper aperture of each of said lock plates for mounting said actuator to a seat member;

a pair of upper clamp members, each pivotally connected to an opposed pair of lock plates and presenting a planar surface in contact with the upper planar surface of said actuating rod;

a spring connected between each lock plate and said lower clamp member to bias the upper and lower clamp members in contact with the upper and lower planar surfaces of said actuating rod to maintain said actuator rod locked to said lower clamp member, maintaining said seat back in a fixed position;

said lock release shaft extending through the central aperture of said lower clamp member, said shaft having a cam for contacting a lower edge of said lock plates located on one side of said actuating rod and moving said lock plates upward to release said actuating rod for movement relative to said clamp members permitting adjustment of the inclination of said seat back through said recliner mechanism; and wherein when a load is applied to said actuator rod in its locked position, the load will be delivered to the seat frame through said mounting spacer by the lock plates on a side of the mounting spacer in the direction of the load causing these load delivering lock plates to pivot downwardly to supply a greater force through the upper clamp members associated with these load delivering lock plates to maintain the actuating rod locked to said lower clamp member.

2. The actuator according to claim 1 wherein the sides of said actuator rod are undercut to form longitudinally extending channels, and each of said lock plates are formed with a projection which extends into said channels so that when said lock plates are moved upwardly by rotation of said lock release shaft, said projections will engage upper shoulders of said channels to lift said actuator rod, positively separating the lower planar friction surface of said rod from the upper planar friction surface of said lower clamp member.

3. The actuator according to claim 1 further comprising a pair of spaced retention plates, one on each side of said actuating rod outboard of said clamp members, through which said mounting spacer and lock release shaft pass and against which said spacer and shaft are axially retained.

4. The actuator according to claim 1 wherein the upper planar friction surface of said lower clamp member and the lower planar friction surface of said actuator rod have inter-locking serrations.

5. The actuator according to claim 1 wherein said actuator rod has a vertically extending stop pin adjacent an end opposite to the end having the pivoted connection, said stop pin contacting said lower clamp member to limit linear motion of said rod.

6. A linear actuator for use in a position adjusting mechanism for adjusting the position of a movable element relative to a stationary member, comprising:

a longitudinally extending actuator rod having an upper planar surface and a lower planar friction surface joined by opposed sides and a pivotal connection at one end for connection to said position adjusting mechanism;

an elongate lower clamp member having an upper planar friction surface for locking engagement with the lower planar friction surface of said rod, and a central aperture for receiving a lock release shaft;

a pair of generally triangular shaped lock plates, parallel and adjacent one of said actuator rod sides pivotally connected to said lower clamp member at opposed ends of said member, and extending upwardly above and inwardly to overlap each other at a midpoint of said lower clamp member;

a mounting spacer received in an upper aperture of each of said lock plates for mounting said actuator rod to said stationary member;

a pair of upper clamp members, each pivotally connected to one of said lock plates and presenting a planar surface in contact with the upper planar surface of said actuator rod;

a spring connected between each lock plate and said lower clamp member to bias the upper and lower clamp members in contact with the upper and lower planar surfaces of said actuating rod creating a locking engagement between the lower planar friction surface of said rod and the upper planar friction surface of said lower clamp member;

a lock release shaft extending through the central aperture of said lower clamp member, said shaft having a cam for contacting a lower edge of said lock plates and moving said lock plates upward to release said actuating rod for movement relative to said clamp members permitting position adjustment of said movable element through said position adjusting mechanism; and wherein when a load is applied to said actuator rod in its locked position, the load will be delivered to said stationary member through said mounting spacer by the lock plate on a side of the mounting spacer in the direction of the load, causing this load delivering lock plate to pivot downwardly to supply a greater force through the associated upper clamp member to maintain the actuating rod locked to said lower clamp member.

7. The linear actuator according to claim 6 wherein a side of said actuator rod is undercut to form a longitudinally extending channel, and each of said lock plates are formed with a projection which extends into said channels so that when said lock plates are moved upwardly by rotation of said lock release shaft, said projections will engage an upper shoulder of said channel to lift said actuator rod, positively separating the lower planar friction surface of said rod from the upper planar friction surface of said lower clamp member.

8. The actuator according to claim 6 wherein the upper planar friction surface of said lower clamp member and the lower planar friction surface of said actuator rod have inter-locking serrations.

* * * * *

UNITED STATES PATENT AND TRADEMARK OFFICE
CERTIFICATE OF CORRECTION

PATENT NO. : 5,618,083
DATED : Apr. 8, 1997
INVENTOR(S) : Martone et al.

It is certified that error appears in the above-identified patent and that said Letters Patent is hereby corrected as shown below:

col. 6, line 55, delete "channels" and insert -- channel --.

Signed and Sealed this

Twenty-sixth Day of January, 1999

Attest:

Attesting Officer

*Acting Commissioner of Patents and Trademarks*